US012513507B2

United States Patent
Bettappanavar et al.

(10) Patent No.: US 12,513,507 B2
(45) Date of Patent: Dec. 30, 2025

(54) METHOD, UE, AND NETWORK DEVICE FOR COORDINATING TUNE AWAY EVENT

(71) Applicant: Samsung Electronics Co., Ltd., Suwon-si (KR)

(72) Inventors: Arunakumar Bettappanavar, Bengaluru (IN); Akshay Rastogi, Bengaluru (IN); Meha Goel, Bengaluru (IN); Shrinath Ramamoorthy Madhurantakam, Bengaluru (IN); Tushar Vrind, Bengaluru (IN); Lalit Kumar Pathak, Bengaluru (IN); Rohit Kumar, Bengaluru (IN)

(73) Assignee: Samsung Electronics Co., Ltd., Gyeonggi-do (KR)

(*) Notice: Subject to any disclaimer, the term of this patent is extended or adjusted under 35 U.S.C. 154(b) by 802 days.

(21) Appl. No.: 17/541,738

(22) Filed: Dec. 3, 2021

(65) Prior Publication Data

US 2022/0182906 A1 Jun. 9, 2022

(30) Foreign Application Priority Data

Dec. 4, 2020 (IN) .............................. 202041052836
Nov. 26, 2021 (IN) .............................. 202041052836

(51) Int. Cl.
*H04W 88/06* (2009.01)
*H04W 8/18* (2009.01)

(52) U.S. Cl.
CPC ............ *H04W 8/183* (2013.01); *H04W 88/06* (2013.01)

(58) Field of Classification Search
CPC .... H04W 8/183; H04W 88/06; H04W 60/005
See application file for complete search history.

(56) References Cited

U.S. PATENT DOCUMENTS 9,294,141 B2  3/2016  Challa et al.
9,578,584 B1  2/2017  Oroskar et al.
(Continued)

FOREIGN PATENT DOCUMENTS

CN    111343686 A    6/2020
EP    3053394 A1     8/2016
(Continued)

OTHER PUBLICATIONS

Office Action for Indian Application No. 202041052836 dated Sep. 2, 2022 and English translation.

*Primary Examiner* — Julio R Perez

(74) *Attorney, Agent, or Firm* — Harness, Dickey & Pierce, P.L.C.

(57) ABSTRACT

Accordingly, the embodiment herein is to provide a method for coordinating tune away event of a Multiple Universal Subscriber Identity Module User Equipment (MUSIM UE) (100), where the MUSIM UE (100) includes a plurality of Subscriber Identity Modules (SIMs) (150). The method includes receiving, by a second SIM (150B) of the MUSIM UE (100), data in a Downlink (DL) message from a network device (200) over an air interface, where the data includes a follow-on indication. Further, the method includes decoding, by the second SIM (150B) of the MUSIM UE (100), the received data. Further, the method includes coordinating, by the second SIM (150B) of the MUSIM UE (100), the tune away event of the MUSIM UE (100) based on the decoding of the received data.

14 Claims, 7 Drawing Sheets

(56) References Cited

U.S. PATENT DOCUMENTS

| | | | |
|---|---|---|---|
| 10,200,928 B2 | 2/2019 | Jamadagni et al. | |
| 12,127,300 B2 | 10/2024 | Xie et al. | |
| 2014/0220981 A1* | 8/2014 | Jheng | H04W 76/15 |
| | | | 455/437 |
| 2015/0289314 A1* | 10/2015 | Yang | H04J 3/17 |
| | | | 455/552.1 |
| 2016/0381710 A1* | 12/2016 | Bansal | H04W 72/12 |
| | | | 370/336 |
| 2018/0160422 A1* | 6/2018 | Pathak | H04W 76/10 |
| 2021/0029773 A1* | 1/2021 | Majumder | H04W 8/183 |
| 2021/0368327 A1 | 11/2021 | Gao | |
| 2023/0309182 A1* | 9/2023 | Krishnamoorthy | |
| | | | H04W 72/0446 |

FOREIGN PATENT DOCUMENTS

| | | |
|---|---|---|
| EP | 3241373 A1 | 11/2017 |
| EP | 3384701 B1 | 10/2020 |
| WO | WO-2016-099786 A1 | 6/2016 |
| WO | 2020/191524 A1 | 10/2020 |
| WO | WO-2021-066562 A1 | 4/2021 |
| WO | WO-2021-075850 A1 | 4/2021 |

* cited by examiner

METHOD, UE, AND NETWORK DEVICE FOR COORDINATING TUNE AWAY EVENT

CROSS-REFERENCE TO RELATED APPLICATIONS

The present invention relates to wireless communication, and more specifically related to a method, a User Equipment (UE), and a network device for coordinated tune away event of a Multiple Universal Subscriber Identity Module UE (MUSIM UE). The present application is based on and claims priority from an Indian Provisional Application Number 202041052836 filed on 4 Dec. 2020 Indian Complete Application Number 202041052836 filed on Nov. 26, 2021, the disclosure of which is hereby incorporated by reference herein.

FIELD OF INVENTION

The present invention relates to wireless communication, and more specifically related to a method, a User Equipment (UE), and a network device for coordinated tune away event of a Multiple Universal Subscriber Identity Module UE (MUSIM UE). The present application is based on and claims priority from an Indian Provisional Application Number 202041052836 filed on 4 Dec. 2020, the disclosure of which is hereby incorporated by reference herein

BACKGROUND

Existing Release-17 of $3^{rd}$ Generation Partnership Project (3GPP) system has introduced a Multi Subscriber Identity Module (MUSIM) work item target to standardize a behavior of a MUSIM (e.g. Dual SIM Dual Standby (DSDS) device for solving problems such as a paging-paging collision(s), a resource wastage(s), and a tune away event(s) due to an uncoordinated leaving of a Network (N/W) by a User Equipment (UE), and so on.

Existing Service and System Aspects (SA) (i.e. SA1-(Services), SA2-(Architecture), etc.) of the 3GPP system provide a solution(s) to overcome the aforementioned problems. Scheduled gaps, autonomous gaps, and coordinated leaving for an unscheduled event(s) are certain solution(s) to overcome those problems.

The scheduled gaps are created for a periodic event(s). Paging is an example of a periodic event(s) (e.g. the periodic event(s) such as page reception procedure has fixed periodicity, say every 640 Millisecond (msec) or 1280 msec). For handling multi-SIM operations, autonomous gaps are created by the UE without any support or configuration from the N/W, and peer stack in the UE can perform any action in these autonomous gaps, such as unscheduled events like measurement or scheduled periodic events like page reception. Furthermore, these autonomous gaps may potentially be causing problems when a Subscriber Identity Module (SIM)-1 of the UE tunes away from an operator without informing the N/W. Other solutions are related to coordinated leaving for the unscheduled events (e.g. Mobile Originated (MO) call, Short Message Service (SMS), etc.), where the SIM-1 of the UE can inform the N/W about the tune away event using a Radio Resource Control (RRC) signalling and/or a Non-Access Stratum (NAS) signalling and/or a Layer-2 (L2) header indicator with minimal signalling overhead. Because control plane procedures (e.g. signalling messages) are very critical and a method to protect control plane procedures would benefit both the N/W and the UE. But, the coordinated leaving is primarily triggered by the UE, and there is no method in the existing 3GPP system in which the N/W can also trigger protections of not tuning-away in some scenario, such as ongoing signalling which needs to be completed in one go, else it can trigger Out of Service or Out of Sync (OOS) scenarios. Thus, it is desired to provide a useful alternative for coordinating the tune away event(s) in the UE.

OBJECT OF INVENTION

The principal object of the embodiments herein is to coordinate a tune away event of a Multiple Universal Subscriber Identity Module User Equipment (MUSIM UE) based on decoding of received data. A network device sends the data in a Downlink (DL) message (e.g. Layer-3 message (Network layer), Layer-2 message (Data link layer), etc.) to the MUSIM UE over an air interface, where the data includes a follow-on bit. The follow-on bit indicates whether a Radio Frequency (RF) resource(s) should be retained or released for a pending signalling event associated with a MUSIM UE's first SIM or subsequent signalling event associated with a MUSIM UE's second SIM. The follow-on bit indication resolves paging-paging collision(s) and resource wastage(s) of the network device and the UE.

Another object of the embodiment herein is to release the RF resource(s) for the pending signalling event associated with the MUSIM UE's first SIM or subsequent signalling event associated with the MUSIM UE's second SIM based on detected RF sharing indication of the MUSIM UE's first SIM or second SIM.

Another object of the embodiment herein is to release the RF resource(s) for the pending signalling event associated with the MUSIM UE's first SIM or subsequent signalling event associated with the MUSIM UE's second SIM based on a detected high priority event(s) of the MUSIM UE's first SIM or second SIM by using an Acknowledge Mode (AM) delay budget mechanism.

Another object of the embodiment herein is to send an UL message to a second network device where the UL message includes the RF sharing indication for the first SIM when the second SIM detects the RF sharing indication for the first SIM. A MUSIM UE sends the data in a Uplink (UL) message (e.g. Layer-3 message, Layer-2 message, etc.) to the network device over an air interface, where the data includes a RF sharing Indication. The RF sharing indication indicates whether a Radio Frequency (RF) resource(s) requirement is detected for the first SIM.

SUMMARY

Accordingly, the embodiment herein is to provide a method for coordinating a tune away event of a Multiple Universal Subscriber Identity Module User Equipment (MUSIM UE), where the MUSIM UE includes a plurality of Subscriber Identity Modules (SIMs). The method includes receiving, by a second SIM of the MUSIM UE, data in a Downlink (DL) message from a network device over an air interface, where the data includes a follow-on indication. Further, the method includes decoding, by the second SIM of the MUSIM UE, the received data. Further, the method includes coordinating, by the second SIM of the MUSIM UE, the tune away event of the MUSIM UE based on the decoding of the received data.

In an embodiment, the DL message includes a Layer-2 message and/or a Layer-3 message.

In an embodiment, the follow-on indication includes a header bit information for the Layer-2 message and/or an information element (IE) for the Layer-3 message.

In an embodiment, the received data is decoded based on the Layer-2 message and/or the Layer-3 message.

In an embodiment, where coordinating, by the second SIM of the MUSIM UE, the tune away event of the MUSIM UE based on the decoding of the received data includes determining, by the second SIM of the MUSIM UE, whether the follow-on indication indicates to retain a Radio Frequency (RF) resource(s). Further, the method includes retaining the RF resource(s) for a subsequent signalling event(s) associated with the second SIM of the MUSIM UE in response to determining that the follow-on indication indicates to retain the RF resource(s). Further, the method includes releasing the RF resource(s) in response to determining that the follow-on indication does not indicate to retain the RF resource(s) and share the RF resource(s) to a first SIM of the MUSIM UE for a pending signalling event(s) associated with the first SIM of the MUSIM UE. Further, the method includes releasing the RF resource(s) based on an RF sharing indication for the first SIM of the MUSIM UE in response to determining that the follow-on indication indicates to retain the RF resource(s). Further, the method includes releasing the RF resource(s) based on an Acknowledge Mode (AM) delay budget in response to determining that the follow-on indication indicates to retain the RF resource(s).

In an embodiment, where releasing the RF resource(s) based on the RF sharing indication for the first SIM of the MUSIM UE includes detecting, by the second SIM of the MUSIM UE, the RF sharing indication for the first SIM of the MUSIM UE. Further, the method includes sending, by the second SIM of the MUSIM UE, an Uplink (UL) message with the RF sharing indication to the network device. Further, the method includes receiving, by the second SIM of the MUSIM UE, the DL message with the follow-on indication from the network device, where the follow-on indication indicates to release of the RF resource(s). Further, the method includes releasing, by the second SIM of the MUSIM UE, the RF resource(s) based on the RF requirement of the first SIM of the MUSIM UE by sharing the RF resource(s) with the first SIM of the MUSIM UE for the pending signalling event(s) associated with the first SIM of the MUSIM UE.

In an embodiment, where releasing the RF resource(s) based on the AM delay budget includes detecting, by the second SIM of the MUSIM UE, a high priority event of the first SIM of the MUSIM UE is pending. Further, the method includes over-riding, by the first SIM of the MUSIM UE, the follow-on indication. Further, the method includes releasing, by the second SIM of the MUSIM UE, the RF resource(s) and sharing the RF resource(s) with the first SIM of the MUSIM UE for the detected high priority event. Further, the method includes receiving, by the second SIM of the MUSIM UE, the RF resource(s) from the first SIM of the MUSIM UE within a predefined threshold time of the AM delay budget.

In an embodiment, where the follow-on indication is received on the second SIM of the MUSIM UE conflicts with a scheduled tune-away event associated with the first SIM of the MUSIM UE includes estimating, by the second SIM of the MUSIM UE, a duration for the scheduled tune-away event, where the network device detects the scheduled tune-away event of the MUSIM UE. Further, the method includes performing, by the second SIM of the MUSIM UE, the scheduled tune-away event within the estimated duration by releasing the RF resource(s) and sending the RF resource(s) to the first SIM of the MUSIM UE for the estimated duration. Further, the method includes receiving, by the second SIM of the MUSIM UE, the RF resource(s) from the first SIM of the MUSIM UE within the estimated duration.

In an embodiment, the second SIM of the MUSIM UE continues with the follow-up indication immediately finishes the scheduled tune-away when the second SIM of the MUSIM UE chooses to ignore or finishes the scheduled tune-away earlier.

Accordingly, the embodiment herein is to provide a method for coordinating the tune away event of the MUSIM UE, where the MUSIM UE includes the plurality of SIMs. The method includes sending, by the network device, data in the DL message to the second SIM of the MUSIM UE over the air interface, where the data includes the follow-on indication. Further, the method includes receiving, by the network device, the UL message from the second SIM of the MUSIM UE in response to sending the DL message, where the UL message includes the RF sharing indication. Further, the method includes determining, by the network device, whether the RF sharing indication indicates retaining the RF resource(s) for the second SIM of the MUSIM UE and/or the first SIM of the MUSIM UE. Further, the method includes sending the follow-on indication to the second SIM of the MUSIM UE to retain the RF resource(s) for the subsequent signalling event(s) associated with the second SIM of the MUSIM UE in response to determining that the RF sharing indication indicates to retain the RF resource(s) for the second SIM of the MUSIM UE. Further, the method includes sending the follow-on indication to the second SIM of the MUSIM UE to release the RF resource(s) and sharing the RF resource(s) with the first SIM of the MUSIM UE for the pending signalling event(s) associated with the first SIM of the MUSIM UE in response to determining that the RF sharing indication indicates to retain the RF resource(s) for the first SIM of the MUSIM UE.

Accordingly, the embodiment herein is to provide the MUSIM UE for coordinating the tune away event. The MUSIM UE includes a tune away controller coupled with a processor and a memory. The tune away controller is configured to receive the data in the DL message from the network device over the air interface, where the data includes the follow-on indication. Further, the tune away controller is configured to decode the received data. Further, the tune away controller is configured to coordinate the tune away event of the MUSIM UE based on the decoding of the received data.

Accordingly, the embodiment herein is to provide the network device for coordinating the tune away event. The network device includes a tune away controller coupled with a processor and a memory. The tune away controller is configured to send the data in the DL message to the second SIM of the MUSIM UE over the air interface, where the data includes the follow-on indication. Further, the tune away controller is configured to receive the UL message from the second SIM of the MUSIM UE in response to sending the DL message, where the UL message includes the RF sharing indication. Further, the tune away controller is configured to determine whether the RF sharing indication indicates retaining the RF resource(s) for the second SIM of the MUSIM UE and/or the first SIM of the MUSIM UE. Further, the tune away controller is configured to send the follow-on indication to the second SIM of the MUSIM UE to retain the RF resource(s) for the subsequent signalling event(s) associated with the second SIM of the MUSIM UE in response to determining that the RF sharing indication indicates to retain the RF resource(s) for the second SIM of the MUSIM UE. Further, the tune away controller is configured to send the follow-on indication to the second SIM of the MUSIM UE to release the RF resource(s) and sharing the RF resource(s) with the first SIM of the MUSIM UE for the pending signalling event(s) associated with the first SIM of the MUSIM UE in response to determining that the RF sharing indication indicates to retain the RF resource(s) for the first SIM of the MUSIM UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
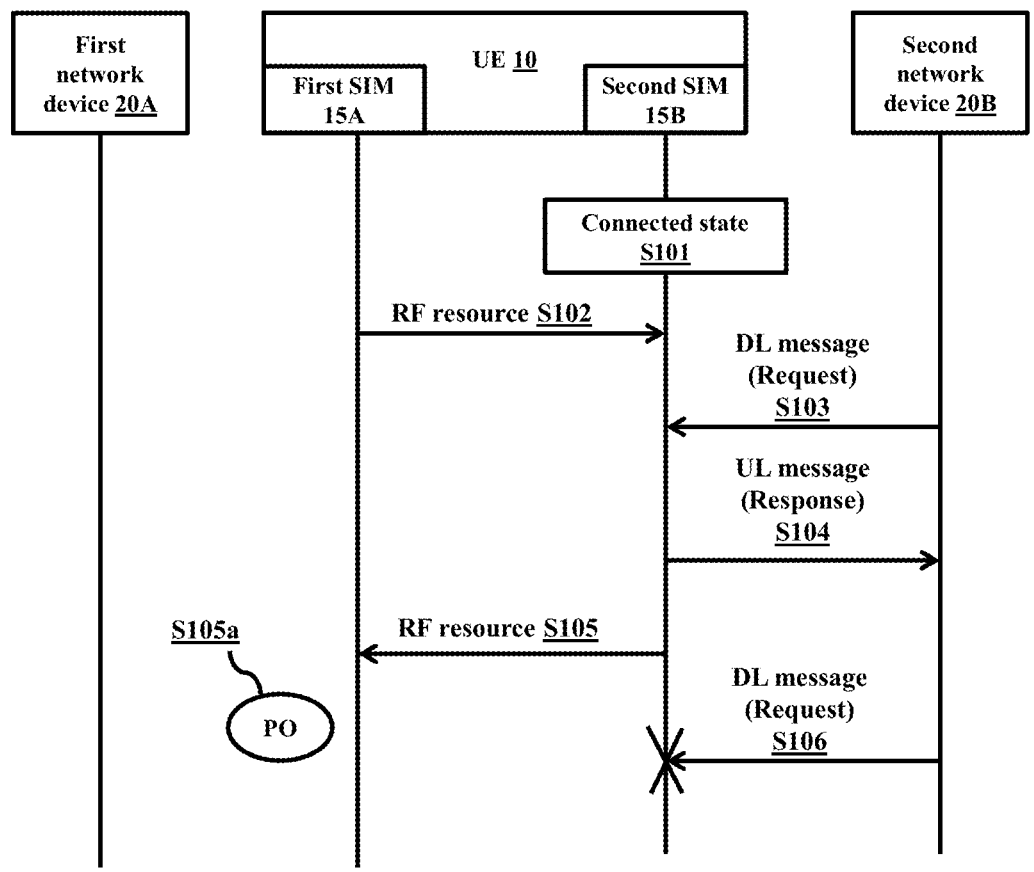
FIG. 1 is a sequence diagram illustrating a method for scheduled events, according to a prior art disclosed herein.

FIG. 1 is a sequence diagram illustrating a method for scheduled events (e.g. paging on peer stack), according to a prior art disclosed herein.

Consider an example scenario in which a User Equipment (UE) (10) includes a first SIM (15A) and a second SIM (15B). The first SIM (15A) is associated with a first network device (20A) (e.g. eNodeB (eNB), gNB, operator-1 base station, etc.) and the second SIM (15B) is associated with a second network device (20B) (e.g. eNB, gNB, operator-2 base station, etc.).

At S101-S102, the second SIM (15B) enters into a connected state and receives an RF resource(s) from the first SIM (15A) to communicate with the second network device (20B). At S103, the second SIM (15B) receives a DL message from the second network device (20B). At S104, the second SIM (15B) sends a UL message to the second network device (20B) in response to receiving the DL message from the second network device (20B). At S105-S106, after sending the UL message, the second SIM (15B) releases the RF resource(s) and shares the RF resource(s) to the first SIM (15A).

If the first SIM (15A) has a pending Paging Occasion (PO) (S105a), then the second SIM (15B) will share the RF to the first SIM (15A), potentially causing the subsequent DL message (S106) from the second network device (20B) to be missed by the first SIM (15)/UE (10). Here, the PO (S105a) may not be even have paging for the first SIM (15A)/the UE (10). Furthermore, if the second network device (20B) does not receive a Layer-2 Acknowledgement (L2ACK) for the subsequent DL message (S106) or does not receive a UL response to the subsequent DL message (S106), then the second network device (20B) will retransmit the subsequent DL message (S106) and may also conclude the second SIM (15B)/UE (10) to be out of synchronization. There is no method in an existing 3GPP system where the network device (e.g., the second network device (20B), the first network device (20A), etc.) can also trigger protections of not tuning-away in some scenario, such as ongoing signalling, requires completion in one go or else it will cause Out Of Service or Out Of Sync (OOS) scenarios. As a result, a network device's (20A and/or 20B) and the UE's (10) resources are squandered.

Figure 2:
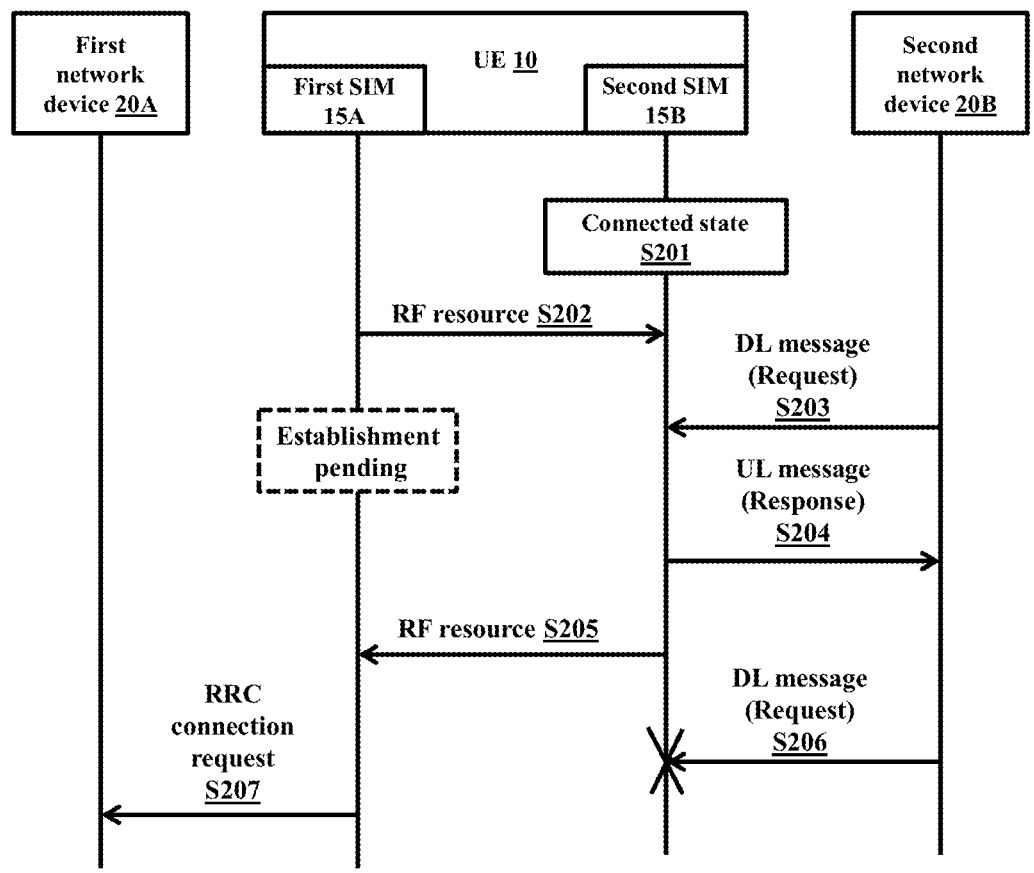
FIG. 2 is a sequence diagram illustrating a method for unscheduled events, according to a prior art disclosed herein.

FIG. 2 is a sequence diagram illustrating a method for unscheduled events (e.g. connection establishment), according to a prior art disclosed herein.

Consider an example scenario in which the UE (10) includes the first SIM (15A) and the second SIM (15B). The first SIM (15A) is associated with the first network device (20A) and the second SIM (15B) is associated with the second network device (20B).

At S201-S202, the second SIM (15B) enters into the connected state and receives the RF resource(s) from the first SIM (15A) to communicate with the second network device (20B). At S202a, unscheduled event, say user initiated data connection is triggered in the first SIM (15A) and the first SIM (15A) enters establishment pending state. At S203, the second SIM (15B) receives the DL message from the second network device (20B). At S204, the second SIM (15B) sends the UL message to the second network device (20B) in response to receiving the DL message from the second network device (20B). At S205, after sending the UL message, the second SIM (15B) releases the RF resource(s) and sends the RF resource(s) to the first SIM (15A).

At S206-S207, after receiving the RF resource(s) from the second SIM (15B), the first SIM (15A) sends a Radio Resource Control (RRC) connection request to the first network device (20A) and because of which caused RF to be released to peer stack leading to missing the subsequent DL message (S206) from the second network device (20B). There is no method in the existing 3GPP system where the network device (e.g., 20A, 20B, etc.) can also trigger protections of not tuning-away in some scenario, such as ongoing signalling, requires completion in one go or else it will cause the OOS scenarios. As a result, the network device's (20A and/or 20B) and the UE's (10) resources are squandered.

Accordingly, the embodiment herein is to provide a method for coordinating tune away event of a Multiple Universal Subscriber Identity Module User Equipment (MUSIM UE), where the MUSIM UE includes a plurality of Subscriber Identity Modules (SIMs). The method includes receiving, by a second SIM of the MUSIM UE, data in a Downlink (DL) message from a network device over an air interface, where the data includes a follow-on indication. Further, the method includes decoding, by the second SIM of the MUSIM UE, the received data. Further, the method includes coordinating, by the second SIM of the MUSIM UE, the tune away event of the MUSIM UE based on the decoding of the received data.

Accordingly, the embodiment herein is to provide a method for coordinating the tune away event of the MUSIM UE, wherein the MUSIM UE includes a plurality of Subscriber Identity Modules (SIMs). The method includes sending, by the network device, data in the DL message to the second SIM of the MUSIM UE over the air interface, where the data includes the follow-on indication. Further, the method includes receiving, by the network device, the UL message from the second SIM of the MUSIM UE in response to sending the DL message, where the UL message includes the RF sharing indication. Further, the method includes determining, by the network device, whether the RF sharing indication indicates to retain the RF resource(s) for the second SIM of the MUSIM UE and/or the first SIM of the MUSIM UE. Further, the method includes sending the follow-on indication to the second SIM of the MUSIM UE to retain the RF resource(s) for the subsequent signalling event(s) associated with the second SIM of the MUSIM UE in response to determining that the RF sharing indication indicates to retain the RF resource(s) for the second SIM of the MUSIM UE. Further, the method includes sending the follow-on indication to the second SIM of the MUSIM UE to release the RF resource(s) and sharing the RF resource(s) to the first SIM of the MUSIM UE for the subsequent signalling event(s) associated with the first SIM of the MUSIM UE in response to determining that the RF sharing indication indicates to retain the RF resource(s) for the first SIM of the MUSIM UE.

Accordingly, the embodiment herein is to provide the MUSIM UE for coordinating the tune away event. The MUSIM UE includes a tune away controller coupled with a processor and a memory. The tune away controller is configured to receive the data in the DL message from the network device over the air interface, where the data includes the follow-on indication. Further, the tune away controller is configured to decode the received data. Further, the tune away controller is configured to coordinate the tune away event of the MUSIM UE based on the decoding of the received data.

Accordingly, the embodiment herein is to provide the network device for coordinating the tune away event. The network device includes a tune away controller coupled with a processor and a memory. The tune away controller is configured to send the data in the DL message to the second SIM of the MUSIM UE over the air interface, where the data includes the follow-on indication. Further, the tune away controller is configured to receive the UL message from the second SIM of the MUSIM UE in response to sending the DL message, where the UL message includes the RF sharing indication. Further, the tune away controller is configured to determine whether the RF sharing indication indicates to retain the RF resource(s) for the second SIM of the MUSIM UE and/or the first SIM of the MUSIM UE. Further, the tune away controller is configured to send the follow-on indication to the second SIM of the MUSIM UE to retain the RF resource(s) for the subsequent signalling event(s) associated with the second SIM of the MUSIM UE in response to determining that the RF sharing indication indicates to retain the RF resource(s) for the second SIM of the MUSIM UE. Further, the tune away controller is configured to send the follow-on indication to the second SIM of the MUSIM UE to release the RF resource(s) and sharing the RF resource(s) to the first SIM of the MUSIM UE for the subsequent signalling event(s) associated with the first SIM of the MUSIM UE in response to determining that the RF sharing indication indicates to retain the RF resource(s) for the first SIM of the MUSIM UE.

Unlike existing methods and systems, the proposed method allows the MUSIM UE to coordinate the tune away event based on decoding of received data. A network device sends the data in the DL message (e.g. Layer-3 message, Layer-2 message, etc.) to the MUSIM UE over an air interface, where the data includes a follow-on bit. The follow-on bit indicates whether the RF resource(s) should be retained or released for a subsequent signalling event associated with the MUSIM UE's first SIM or second SIM. The follow-on bit indication resolves paging-paging collision(s) and resource wastage(s) of the network device and the UE.

Unlike existing methods and systems, the proposed method allows the MUSIM UE to release the RF resource(s) for the subsequent signalling event associated with the MUSIM UE's first SIM or second SIM based on the detected RF sharing indication of the MUSIM UE's first SIM or second SIM.

Unlike existing methods and systems, the proposed method allows the MUSIM UE to release the RF resource(s) for the subsequent signalling event associated with the MUSIM UE's first SIM or second SIM based on detected a high priority event(s) of the MUSIM UE's first SIM or second SIM by using an Acknowledge Mode (AM) delay budget mechanism.

Referring now to the drawings and more particularly to FIGS. 3A through 6, where similar reference characters denote corresponding features consistently throughout the figures, there are shown preferred embodiments.

Figure 3A:
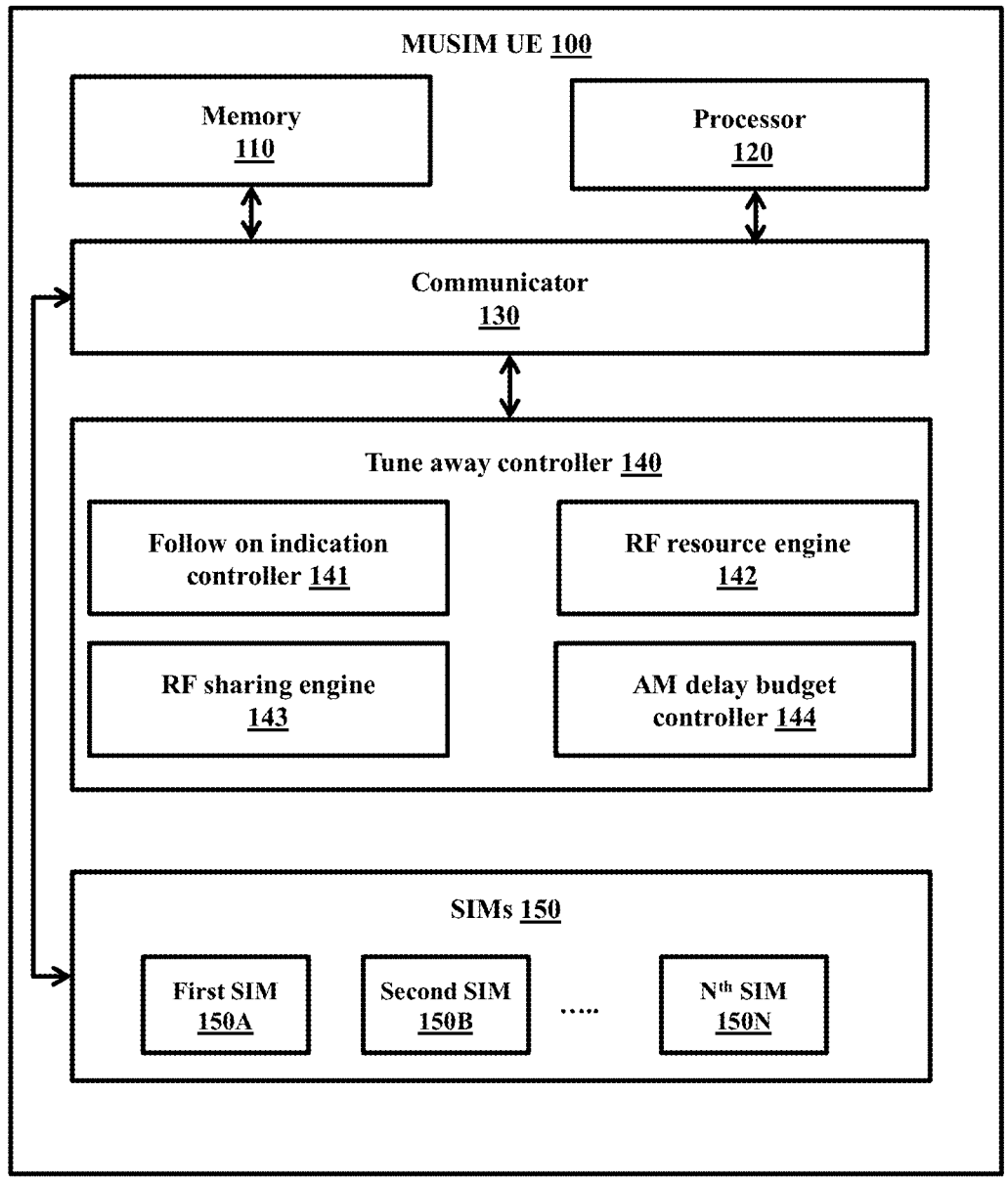
FIG. 3A illustrates a block diagram of a Multiple Universal Subscriber Identity Module User Equipment (MUSIM UE) for coordinating a tune away event, according to an embodiment as disclosed herein.

FIG. 3A illustrates a block diagram of the MUSIM UE (100) for coordinating a tune away event, according to an embodiment as disclosed herein. Examples of the MUSIM UE (100) include, but are not limited to a smartphone, a tablet computer, a Personal Digital Assistance (PDA), an Internet of Things (IoT) device, a wearable device, etc.

In an embodiment, the MUSIM UE (100) includes a memory (110), a processor (120), a communicator (130), a tune away controller (140), and a plurality of SIMs (150).

In an embodiment, the memory (110) is configured to store various events (e.g. paging, connection establishment, etc.) detected at a first SIM (150a) and a second SIM (150b-150n), and a follow-on indication. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EE-PROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the MUSIM UE (100), a cloud storage, or any other type of external storage.

The processor (120) communicates with the memory (110), the communicator (130), the tune away controller (140), and the plurality of SIMs (150). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components and with external devices (e.g. network device, eNodeB, gNodeB, server, etc.) via one or more networks (e.g. Radio technology). The communicator (130) includes an electronic circuit specific to a standard that enables wired or wireless communication.

The tune away controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the tune away controller (140) includes a follow-on indication controller (141), an RF resource engine (142), an RF sharing engine (143), and an AM delay budget controller (144).

The follow-on indication controller (141) receives data in a Downlink (DL) message from a network device (200) over an air interface, where the data includes a follow-on indication. The DL message includes a Layer-2 message and/or a Layer-3 message. The follow-on indication includes a header bit information for the Layer-2 message and/or an information element (IE) for the Layer-3 message. Furthermore, the follow-on indication controller (141) decodes the received data. The received data is decoded based on the Layer-2 message and/or the Layer-3 message.

The RF resource engine (142) determines whether the follow-on indication indicates retaining a Radio Frequency (RF) resource(s). Furthermore, the RF resource engine (142) retains the RF resource(s) for a subsequent signalling event(s) (e.g. DL message) associated with the second SIM (150B) of the MUSIM UE (100) in response to determining that the follow-on indication indicates to retain the RF resource(s). Furthermore, the RF resource engine (142) releases the RF resource(s) in response to determining that the follow-on indication does not indicate to retain the RF resource(s) and sharing the RF resource(s) with the first SIM (150A) of the MUSIM UE (100) for a subsequent signalling event(s) (e.g. paging, connection establishment, etc.) associated with the first SIM (150A) of the MUSIM UE (100).

The RF sharing engine (143) releases the RF resource(s) based on an RF sharing indication for the first SIM (150A) of the MUSIM UE (100) in response to determining that the follow-on indication indicates to retain the RF resource(s). Furthermore, the RF sharing engine (143) detects the RF sharing indication for the first SIM (150A) of the MUSIM UE (100). Furthermore, the RF sharing engine (143) sends an Uplink (UL) message with the RF sharing indication to the network device (200). Furthermore, the RF sharing engine (143) receives the DL message with the follow-on indication from the network device (200), where the follow-on indication indicates to release of the RF resource(s). Furthermore, the RF sharing engine (143) releases the RF resource(s) based on the RF sharing indication for the first SIM (150A) of the MUSIM UE (100) by sharing the RF resource(s) with the first SIM (150A) of the MUSIM UE (100) for the subsequent signalling event(s) associated with the first SIM (150A) of the MUSIM UE (100).

The AM delay budget controller (144) detects a high priority event (e.g. call) of the first SIM (150A) of the MUSIM UE (100) is pending. Furthermore, the AM delay budget controller (144) over-rides the follow-on indication. Furthermore, the AM delay budget controller (144) releases the RF resource(s) and sends the RF resource(s) to the first SIM (150A) of the MUSIM UE (100) for the detected high priority event. Furthermore, the AM delay budget controller (144) receives the RF resource(s) from the first SIM (150A) of the MUSIM UE (100) within a predefined threshold time of the AM delay budget.

Furthermore, the AM delay budget controller (144) estimates a duration for the scheduled tune-away event, where the network device (200) detects the scheduled tune-away event of the MUSIM UE (100). Furthermore, the AM delay budget controller (144) performs the scheduled tune-away event within the estimated duration by releasing the RF resource(s) and sharing the RF resource(s) with the first SIM (150A) of the MUSIM UE (100) for the estimated duration. Furthermore, the AM delay budget controller (144) receives the RF resource(s) from the first SIM (150A) of the MUSIM UE (100) within the estimated duration. The second SIM (150B) of the MUSIM UE (100) continues with the follow-up indication immediately finishes the scheduled tune-away when the second SIM (150B) of the MUSIM UE (100) chooses to ignore or finishes the scheduled tune-away earlier.

Although the FIG. 3A shows various hardware components of the MUSIM UE (100) but it is to be understood that other embodiments are not limited thereon. In other embodiments, the MUSIM UE (100) may include less or more number of components. Further, the labels or names of the components are used only for illustrative purpose and does not limit the scope of the invention. One or more components can be combined to perform the same or substantially similar function to coordinate the tune away event.

Figure 3B:
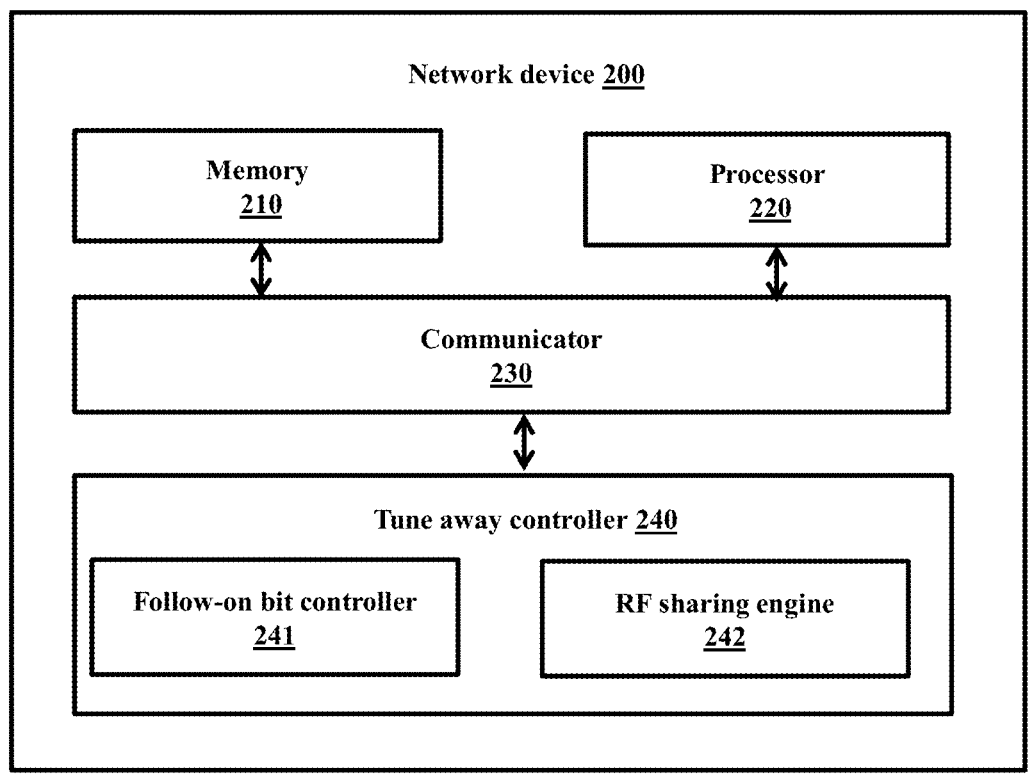
FIG. 3B illustrates a block diagram of a network device for coordinating the tune away event, according to an embodiment as disclosed herein.

FIG. 3B illustrates a block diagram of the network device (200) (e.g. first network device (200A), second network device (200B), etc.) for coordinating the tune away event, according to an embodiment as disclosed herein.

In an embodiment, the network device (200) includes a memory (210), a processor (220), a communicator (230), and a tune away controller (240).

In an embodiment, the memory (210) is configured to store various events (e.g. paging, connection establishment, etc.) detected at the first SIM (150a) and the second SIM (150b-150n), and the follow-on indication. The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). The memory (210) can be an internal storage unit or it can be an external storage unit of the network device (200), a cloud storage, or any other type of external storage.

The processor (220) communicates with the memory (210), the communicator (230), and the tune away controller (240). The processor (220) is configured to execute instructions stored in the memory (210) and to perform various processes. The processor (220) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230) is configured for communicating internally between internal hardware components and with external devices (e.g. MUSIM UE (100)) via one or more networks (e.g. Radio technology). The communicator (230) includes an electronic circuit specific to a standard that enables wired or wireless communication.

The tune away controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the tune away controller (240) includes a follow-on indication controller (241), and an RF sharing engine (242).

The follow-on indication controller (241) sends the data in the DL message to the second SIM (150B) of the MUSIM UE (100) over an air interface, where the data includes the follow-on indication. The RF sharing engine (242) receives the UL message from the second SIM (150B) of the MUSIM UE (100) in response to sending the DL message, where the UL message includes the RF sharing indication. Furthermore, the RF sharing engine (242) determines whether the RF sharing indication indicates to retain the RF resource(s) for the second SIM (150B) of the MUSIM UE (100) and/or the first SIM (150A) of the MUSIM UE (100). Furthermore, the RF sharing engine (242) sends the follow-on indication to the second SIM (150B) of the MUSIM UE (100) to retain the RF resource(s) for the subsequent signalling event(s) associated with the second SIM (150B) of the MUSIM UE (100) in response to determining that the RF sharing indication indicates to retain the RF resource(s) for the second SIM (150B) of the MUSIM UE (100). Furthermore, the RF sharing engine (242) sends the follow-on indication to the second SIM (150B) of the MUSIM UE (100) to release the RF resource(s) and share the RF resource(s) with the first SIM (150A) of the MUSIM UE (100) for the subsequent signalling event(s) associated with the first SIM (150A) of the MUSIM UE (100) in response to determining that the RF sharing indication indicates to retain the RF resource for the first SIM (150A) of the MUSIM UE (100).

Although the FIG. 3B shows various hardware components of the network device (200) but it is to be understood that other embodiments are not limited thereon. In other embodiments, the network device (200) may include less or more number of components. Further, the labels or names of the components are used only for illustrative purpose and does not limit the scope of the invention. One or more components can be combined to perform the same or substantially similar function to coordinate the tune away event.

Figure 4:
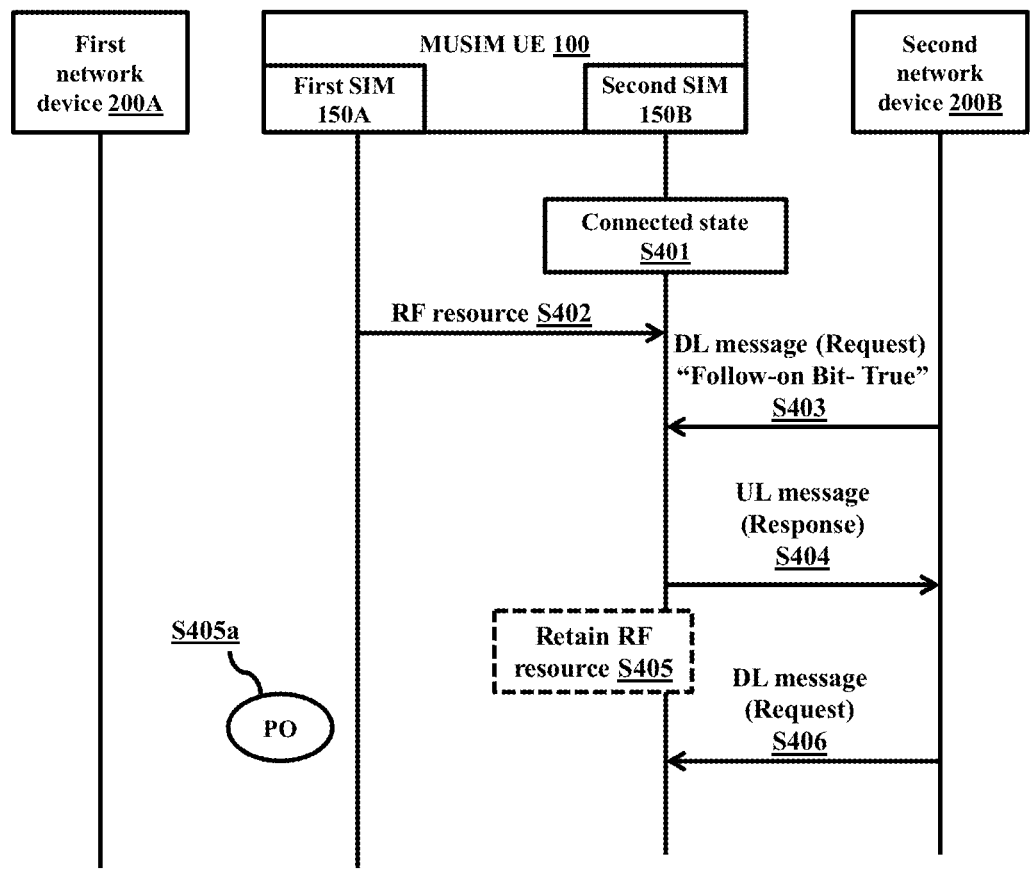
FIG. 4 is a proposed sequence diagram illustrating a method for coordinating the tune away event for the scheduled events, according to an embodiment as disclosed herein.

FIG. 4 is a proposed sequence diagram illustrating a method for coordinating the tune away event for the scheduled events, according to an embodiment as disclosed herein.

Consider an example scenario in which the MUSIM UE (100) includes the first SIM (150A) and the second SIM (150B). The first SIM (150A) is associated with a first network device (200A) (e.g. eNodeB (eNB), gNB, operator-1 base station, etc.) and the second SIM (150B) is associated with a second network device (200B) (e.g. eNB, gNB, operator-2 base station, etc.).

At S401-S402, the second SIM (150B) enters into a connected state and receives the RF resource(s) from the first SIM (150A) to communicate with the second network device (200B). At S403, the second SIM (150B) receives the DL message from the second network device (200B). The DL message includes the follow-on indication (e.g. "True=retain the RF resource(s)" and "False=release the RF resource(s)"). At S404-S406, the second SIM (150B) sends the UL message to the second network device (200B) and retains the RF resource for the subsequent signalling event (S406: DL message) associated with the second SIM (150B) of the MUSIM UE (100) in response to determining that the follow-on indication indicates to retain the RF resource(s).

In the proposed method, where the network device (e.g., 200B) triggers the protections of not tuning-away in some scenario, such as ongoing signalling, requires completion in one go or else it will cause the OOS scenarios. As a result, the network devices (200A and/or 200B) and the MUSIM UE's (100) resources are not squandered. Furthermore, if the first SIM (150A) has a pending PO (S405a), a peer stack RF will not be shared by the MUSIM UE (100), as a result, the subsequent DL message (S106) from the second network device (200B) will not be missed at the MUSIM UE (100). Here, the PO (S405a) may not even have paging for the first SIM (150A)/the MUSIM UE (100).

Figure 5:
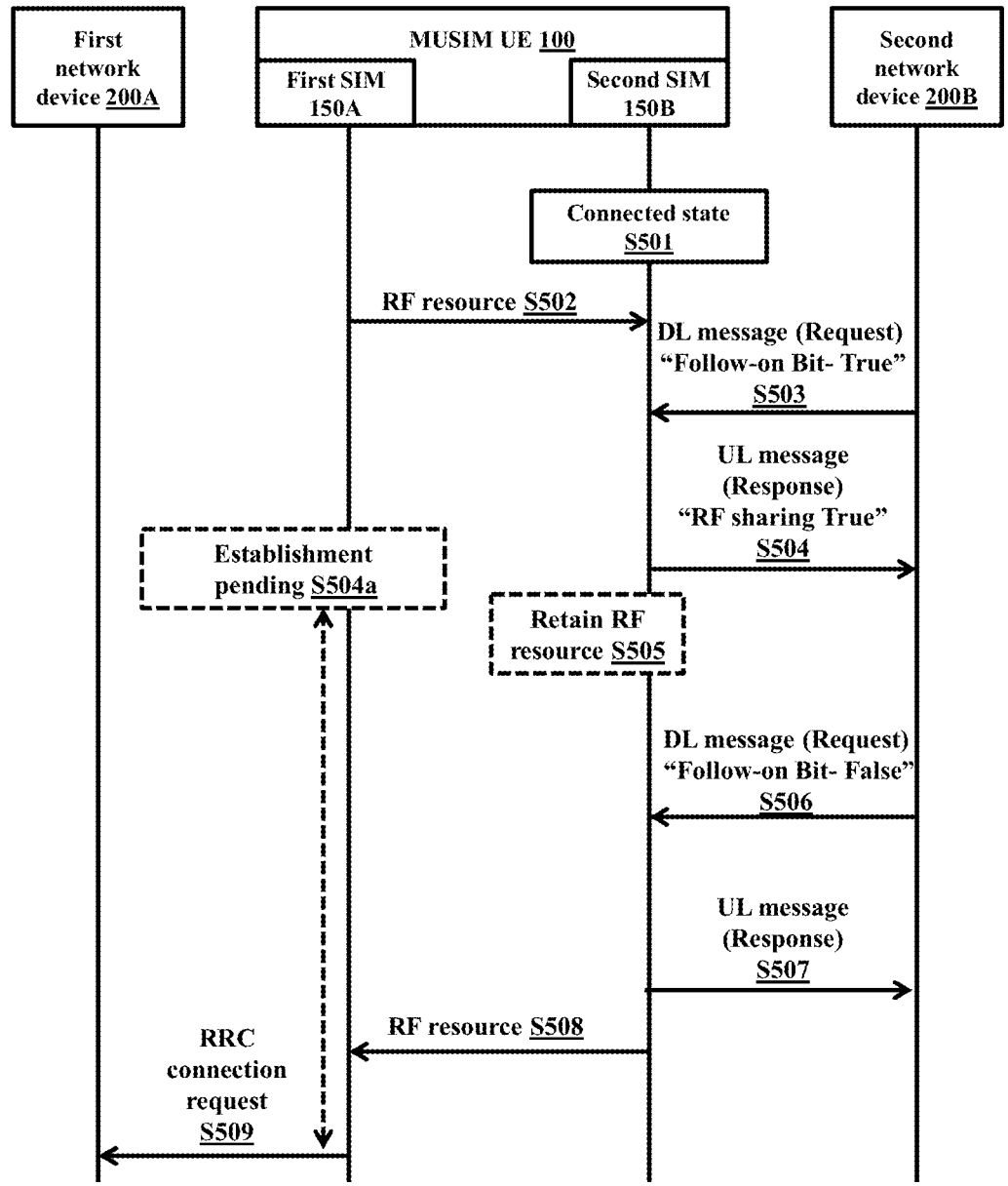
FIG. 5 is a proposed sequence diagram illustrating a method for coordinating the tune away event for the unscheduled events, according to an embodiment as disclosed herein.

FIG. 5 is a proposed sequence diagram illustrating a method for coordinating the tune away event for the unscheduled events, according to an embodiment as disclosed herein.

Consider an example scenario in which the MUSIM UE (100) includes the first SIM (150A) and the second SIM (150B). The first SIM (150A) is associated with the first network device (200A) and the second SIM (150B) is associated with the second network device (200B).

At S501-S502, the second SIM (150B) enters into the connected state and receives the RF resource(s) from the first SIM (150A) to communicate with the second network device (200B). At S503, the second SIM (150B) receives the DL message from the second network device (200B). The DL message includes the follow-on indication (e.g. "True=retain the RF resource(s)"). At S504, the second SIM (150B) sends the UL message to the second network device (200B), where the UL message includes the RF sharing indication for the first SIM (150A) of the MUSIM UE (100) when the second SIM (150B) of the MUSIM UE (100) detects the RF sharing indication (S504a) for the first SIM (150A) of the MUSIM UE (100). At S505, the second SIM (150B) of the MUSIM UE (100) retains the RF resource for the subsequent signalling event (S506: DL message) associated with the second SIM (150B) of the MUSIM UE (100), where the DL message includes the follow-on indication (e.g. "False=release the RF resource(s)").

At S507, the second SIM (150B) of the MUSIM UE (100) sends the UL message with RF sharing indication to the second network device (200B) in response to receiving the DL message (S506). At S508, the second SIM (150B) of the MUSIM UE (100) releases the RF resource(s) based on the RF sharing indication for the first SIM (150A) of the MUSIM UE (100) by sharing the RF resource(s) with the first SIM (150A) of the MUSIM UE (100) for the subsequent signalling event(s) (e.g. RRC connection request) associated with the first SIM (150A) of the MUSIM UE (100). At S509, the first SIM (150A) of the MUSIM UE (100) sends the RRC connection request to the first network device (200A) to complete the pending establishment (S504a).

In the proposed method, where the network device (e.g., 200B) triggers the tuning-away if some scenario, such as pending establishment (S504a)/to completes the unscheduled events. As a result, the network devices (200A and/or 200B) and the MUSIM UE's (100) resources are not squandered and collision of paging/signalling does not occur at the network devices (200A and/or 200B) and the MUSIM UE (100).

Figure 6:
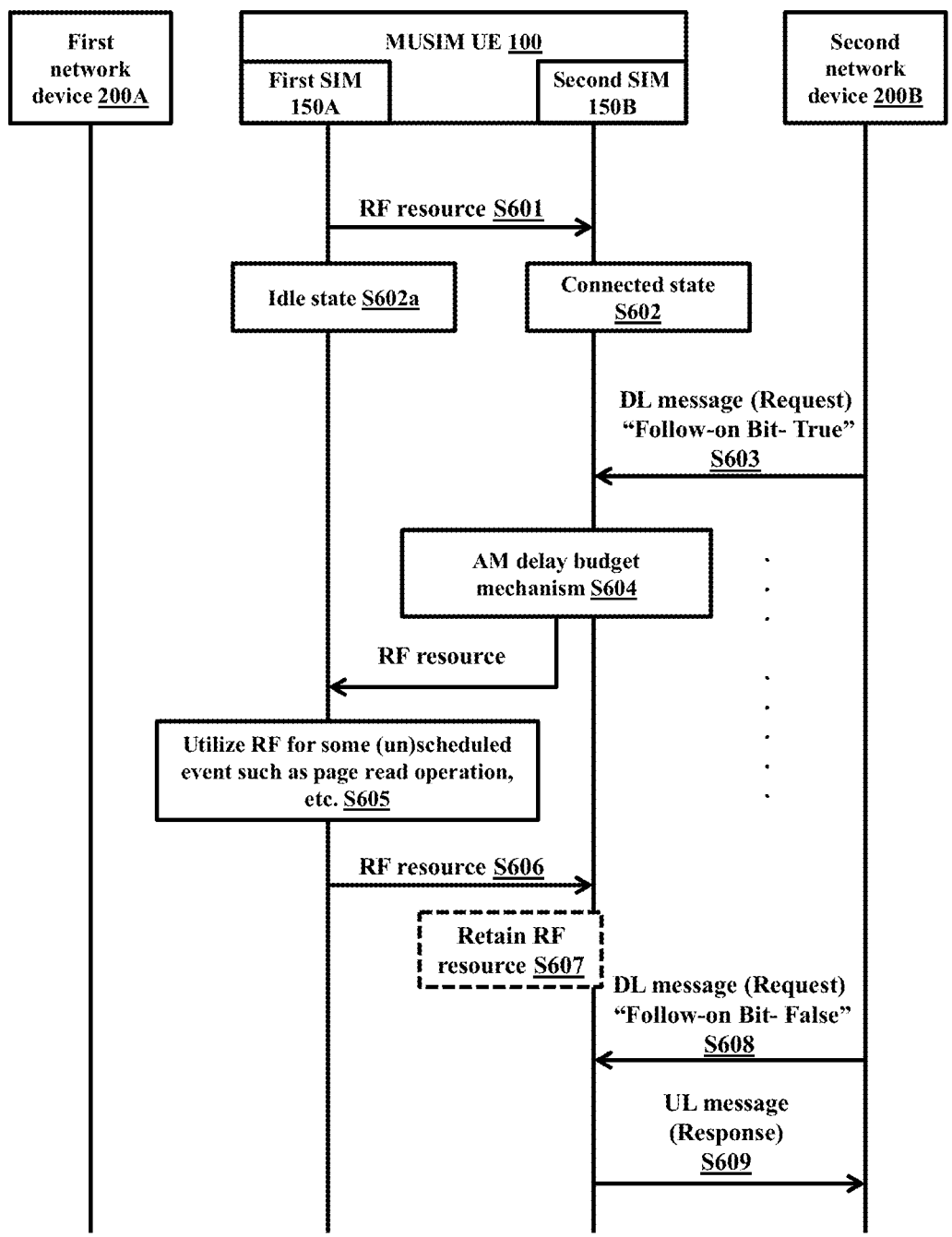
FIG. 6 is a proposed sequence diagram illustrating a method for coordinating the tune away event for the unscheduled events based on an Acknowledge Mode (AM) delay budget, according to an embodiment as disclosed herein.

FIG. 6 is a proposed sequence diagram illustrating a method for coordinating the tune away event for the unscheduled events based on the AM delay budget, according to an embodiment as disclosed herein.

Consider an example scenario in which the MUSIM UE (100) includes the first SIM (150A) and the second SIM (150B). The first SIM (150A) is associated with the first network device (200A) and the second SIM (150B) is associated with the second network device (200B).

At S601-S602, the second SIM (150B) enters into the connected state, i.e. the first SIM (150A) enters into an idle state (S602a), and receives the RF resource(s) from the first SIM (150A) to communicate with the second network device (200B). At S603, the second SIM (150B) receives the DL message from the second network device (200B). The DL message includes the follow-on indication (e.g. "True=retain the RF resource(s)"). At S604, the second SIM (150B) of the MUSIM UE (100) detects the high priority event (or equivalent event) of the first SIM (150A) of the MUSIM UE (100) is pending. Furthermore, the second SIM (150B) of the MUSIM UE (100) overrides the follow-on indication in response to detecting the high priority event. Furthermore, the second SIM (150B) of the MUSIM UE (100) releases the RF resource(s) and shares the RF resource (s) to the first SIM (150A) of the MUSIM UE (100) for the detected high priority event.

At S605-S606, the first SIM (150A) of the MUSIM UE (100) utilizes the received RF resource(s) to perform/complete the detected high priority event (e.g. unscheduled event) and sends the RF resource(s) to the second SIM (150B) of the MUSIM UE (100), after completing the detected high priority event, within the threshold time of the AM delay budget. In the meantime, one or more Radio Link Controller (RLC) retransmissions of DL message with follow on bit set to true would be scheduled by the network device (200) towards the second SIM (150B) of the MUSIM UE (100) whether it was received or not by the receiver since second SIM did not acknowledge this PDU to the network device (200).

Furthermore, the first SIM (150A) of the MUSIM UE (100) overrides the second SIM (150B) of the MUSIM UE (100) follow on bit request and does some operation and then gives back to the second SIM (150B) of the MUSIM UE (100). In the meantime, one or more Radio Link Controller (RLC) retransmissions of DL message with follow on bit set to true would be scheduled by the network device (200) towards the second SIM (150B) of the MUSIM UE (100) whether it was received or not by the receiver since the second SIM (150B) did not acknowledge this PDU to the network device (200).

The threshold time is defined as "AM (Acknowledge mode) delay budget" where the DL message containing the follow-up indication is an AM packet and therefore it is constrained to be retransmitted max number of times until it is acknowledged from the receiver. Thus, the AM delay budget could be defined as "0<AM_Delay_Budget< (max_rlc_retx−1)*poll_timer", wherein 'poll_timer' is defined as the minimum waiting time of a transmitter device for receiving an RLC ACK/NAK after transmitting UL PDU with poll bit set and on whose expiry transmitter retransmits the PDU. That is, we can say that poll_timer is indicative of 'T-PollRetransmit' as defined in 3GPP standard or similar such timer as defined in future wireless RAT standard that regulate RLC ACK/NAK exchange via timer between transmitter and receiver.

At S607-S608, the second SIM (150B) of the MUSIM UE (100) retains the RF resource(s) and receives the DL message from the second network device (200B). The DL message includes the follow-on indication (e.g. "False=release the RF resource(s)"). At S609, the second SIM (150B) of the MUSIM UE (100) sends the UL message with RF sharing indication to the second network device (200B) in response to receiving the DL message from the second network device (200B).

In an embodiment, the second SIM (150B) of the MUSIM UE (100) continues with the follow-up indication immediately finishes the scheduled tune-away when the second SIM (150B) of the MUSIM UE (100) chooses to ignore the scheduled tune-away or the first SIM (150A) finishes the scheduled tune-away earlier.

Since based on the UE capabilities, the network is aware that the UE is DSDS device, so some provisions can also be given in specification about coordinate leaving from the network to the UE, based on which the UE can honor not to tune away in scheduled/autonomous gaps or unscheduled events.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for coordinating a tune away event of a Multiple Universal Subscriber Identity Module User Equipment (MUSIM UE) wherein the MUSIM UE comprises a plurality of Subscriber Identity Modules (SIMs), the method comprising:
   receiving, by a second SIM of the MUSIM UE, data in a Downlink (DL) message from a network device over an air interface, wherein the data comprises at least one follow-on bit, the at least one follow-on bit indicating whether to retain at least one Radio Frequency (RF) resource for the second SIM or to release the at least one RF resource for a first SIM of the MUSIM UE;
   decoding, by the second SIM of the MUSIM UE, the data received in the DL message; and
   coordinating, by the second SIM of the MUSIM UE, the tune away event of the MUSIM UE based on the decoding of the data received in the DL message.

2. The method as claimed in claim 1, wherein the DL message comprises at least one of a Layer-2 message and a Layer-3 message.

3. The method as claimed in claim 2, wherein the at least one follow-on bit comprises at least one of a header bit information for the Layer-2 message and an Information Element (IE) for the Layer-3 message.

4. The method as claimed in claim 2, wherein the data received in the DL message is decoded based on the at least one of the Layer-2 message and the Layer-3 message.

5. The method as claimed in claim 1, wherein coordinating, by the second SIM of the MUSIM UE, the tune away event of the MUSIM UE based on the decoding of the data received in the DL message comprises:
   determining, by the second SIM of the MUSIM UE, whether the at least one follow-on bit indicates to retain the at least one RF resource or to release the at least one RF resource; and
   performing, by the second SIM of the MUSIM UE, one of:
      retaining the at least one RF resource for at least one subsequent signalling event associated with the second SIM of the MUSIM UE in response to determining that the at least one follow-on bit indicates to retain the at least one RF resource,
      releasing the at least one RF resource in response to determining that the at least one follow-on bit does not indicate to retain the at least one RF resource and sending the at least one RF resource to the first SIM of the MUSIM UE for at least one subsequent signalling event associated with the first SIM of the MUSIM UE;
      releasing the at least one RF resource based on an RF sharing indication for the first SIM of the MUSIM UE in response to determining that the at least one follow-on bit indicates to retain the at least one RF resource; or
      releasing the at least one RF resource based on an Acknowledge Mode (AM) delay budget in response to determining that the at least one follow-on bit indicates to retain the at least one RF resource.

6. The method as claimed in claim 5, wherein releasing the at least one RF resource based on the RF sharing indication for the first SIM of the MUSIM UE comprises:
   detecting, by the second SIM of the MUSIM UE, the RF sharing indication for the first SIM of the MUSIM UE;
   sending, by the second SIM of the MUSIM UE, an Uplink (UL) message with the RF sharing indication to the network device;
   receiving, by the second SIM of the MUSIM UE, the DL message with the at least one follow-on bit from the network device, wherein the at least one follow-on bit indicates to release the at least one RF resource; and
   releasing, by the second SIM of the MUSIM UE, the at least one RF resource based on the RF sharing indication for the first SIM of the MUSIM UE by sending the at least one RF resource to the first SIM of the MUSIM UE for the at least one subsequent signalling event associated with the first SIM of the MUSIM UE.

7. The method as claimed in claim 5, wherein releasing the at least one RF resource based on the AM delay budget comprises:

detecting, by the second SIM of the MUSIM UE, a high priority event of the first SIM of the MUSIM UE is pending;

over-riding, by the first SIM of the MUSIM UE, the at least one follow-on bit;

releasing, by the second SIM of the MUSIM UE, the at least one RF resource and sending the at least one RF resource to the first SIM of the MUSIM UE for the high priority event detected of the first SIM; and receiving, by the second SIM of the MUSIM UE, the at least one RF resource from the first SIM of the MUSIM UE within a predefined threshold time of the AM delay budget.

8. The method as claimed in claim 7, wherein, in response to the at least one follow-on bit being received on the second SIM of the MUSIM UE conflicting with a scheduled tune-away event associated with the first SIM of the MUSIM UE, the method comprises:

estimating, by the second SIM of the MUSIM UE, a duration for the scheduled tune-away event, wherein the network device detects the scheduled tune-away event of the MUSIM UE;

performing, by the second SIM of the MUSIM UE, the scheduled tune-away event within the duration estimated for the scheduled tune-away event by releasing the at least one RF resource and sending the at least one RF resource to the first SIM of the MUSIM UE for the duration estimated for the scheduled tune-away event; and receiving, by the second SIM of the MUSIM UE, the at least one RF resource from the first SIM of the MUSIM UE within the duration estimated for the scheduled tune-away event.

9. The method as claimed in claim 8, wherein the second SIM of the MUSIM UE continues with the at least one follow-on bit immediately finishes the scheduled tune-away event when the second SIM of the MUSIM UE chooses to ignore or finished the scheduled tune-away event earlier.

10. A method for coordinating a tune away event of a Multiple Universal Subscriber Identity Module User Equipment (MUSIM UE), wherein the MUSIM UE comprises a plurality of Subscriber Identity Modules (SIMs), the method comprising:

sending, by a network device, data in a Downlink (DL) message to a second SIM of the MUSIM UE over an air interface, wherein the data comprises at least one follow-on bit;

receiving, by the network device, an Uplink (UL) message from the second SIM of the MUSIM UE in response to sending the DL message, wherein the UL message comprises an RF sharing indication;

determining, by the network device, whether the RF sharing indication indicates to retain at least one Radio Frequency (RF) resource for at least one of the second SIM of the MUSIM UE and a first SIM of the MUSIM UE; and performing, by the network device, one of:

sending the at least one follow-on bit to the second SIM of the MUSIM UE to retain the at least one RF resource for at least one subsequent signalling event associated with the second SIM of the MUSIM UE in response to determining that the RF sharing indication indicates to retain the at least one RF resource for the second SIM of the MUSIM UE, or sending the at least one follow-on bit to the second SIM of the MUSIM UE to release the at least one RF resource and sending the at least one RF resource to the first SIM of the MUSIM UE for at least one subsequent signalling event associated with the first SIM of the MUSIM UE in response to determining that the RF sharing indication indicates to retain the at least one RF resource for the first SIM of the MUSIM UE.

11. The method as claimed in claim 10, wherein the DL message and UL message comprises at least one of a Layer-2 message and a Layer-3 message.

12. The method as claimed in claim 11, wherein the at least one follow-on bit comprises at least one of a header bit information for the Layer-2 message and an Information Element (IE) for the Layer-3 message.

13. A Multiple Universal Subscriber Identity Module User Equipment (MUSIM UE) for coordinating a tune away event, wherein the MUSIM UE comprises a plurality of Subscriber Identity Modules (SIMs), the MUSIM UE comprising:

a memory;

a processor; and a tune away controller, operably connected to the memory and the processor, configured to:

receive data in a Downlink (DL) message from a network device over an air interface, wherein the data comprises at least one follow-on bit, the at least one follow-on bit indicating whether to retain at least one Radio Frequency (RF) resource for a second SIM of the MUSIM UE or to release the at least one RF resource for a first SIM of the MUSIM UE;

decode the data received in the DL message; and coordinate the tune away event of the MUSIM UE based on the decoding of the data received in the DL message.

14. The MUSIM UE as claimed in claim 13, wherein the DL message comprises at least one of a Layer-2 message and a Layer-3 message.

* * * * *